United States Patent [19]

Martin

[11] 4,230,816
[45] Oct. 28, 1980

[54] THIOFUNCTIONAL POLYSILOXANE POLYMERS

[75] Inventor: Eugene R. Martin, Onsted, Mich.

[73] Assignee: SWS Silicones Corporation, Adrian, Mich.

[21] Appl. No.: 968,153

[22] Filed: Dec. 11, 1978

[51] Int. Cl.³ .................................. C08G 77/06
[52] U.S. Cl. .................................. 528/12; 528/14; 528/18; 528/21; 528/23; 528/30; 528/33; 528/37; 556/427; 556/429
[58] Field of Search .............. 528/30, 12, 23, 21, 528/18, 14, 33, 37; 260/448.2 N

[56] References Cited

U.S. PATENT DOCUMENTS

| | | | |
|---|---|---|---|
| 3,388,144 | 6/1968 | Musolf et al. | 260/448.2 R |
| 3,655,713 | 4/1972 | LeGrow | 260/448.2 N |
| 3,873,499 | 3/1975 | Michael et al. | 528/30 |
| 4,046,795 | 9/1977 | Martin | 260/448.2 E |
| 4,066,603 | 1/1978 | Homan et al. | 528/30 |
| 4,151,156 | 4/1979 | Itoh et al. | 528/30 |

*Primary Examiner*—Melvyn I. Marquis

[57] ABSTRACT

The invention relates to a process for preparing thiofunctional polysiloxane polymers which comprises equilibrating in the presence of an acid catalyst a mixture containing (1) an organopolysiloxane having at least four silicon atoms per molecule and (2) a thiofunctional polysiloxane copolymer having at least one unit of the formula

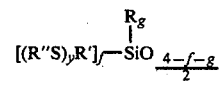

and the other units are selected from the formulas $R_2SiO$, $R_3SiO_{0.5}$, and $RO_{0.5}$, wherein R is a monovalent hydrocarbon radical having from 1 to 18 carbon atoms, R' is a substituted or unsubstituted divalent, trivalent or tetravalent hydrocarbon radical free of aliphatic unsaturation having from 1 to 18 carbon atoms, hydrocarbon ether, hydrocarbon thioether, hydrocarbon ester and hydrocarbon thioester radicals, R'' is a monovalent hydrocarbon radical or hydrogen, f is a number of from 1 to 3, g is a number of from 0 to 1 and the sum of f+g is from 1 to 3 and y is a number of from 1 to 3.

10 Claims, No Drawings

THIOFUNCTIONAL POLYSILOXANE POLYMERS

The present invention relates to polysiloxane polymers and more particularly to thiofunctional polysiloxane polymers and to a method for preparing the same.

BACKGROUND OF THE INVENTION

Heretofore, sulfur containing compounds have been prepared by reacting hydroxyl-terminated dimethylpolysiloxane fluids with a methoxy containing silacyclopentane thiol in the presence of an acid clay to affect the condensation reaction of the sulfur containing silane and the dimethylpolysiloxane. In the condensation reaction, the acid clay not only catalyzes the condensation between the methoxy groups of the sulfur containing compound and the hydroxyl groups of the dimethylpolysiloxane but also catalyzes the condensation between hydroxyl groups to form a mixture of compounds. Furthermore, the process requires that a preformed hydroxyl-terminated dimethylpolysiloxane fluid be prepared prior to the condensation reaction.

Viventi discloses in U.S. Pat. No. 3,346,405, a process for preparing sulfur containing siloxanes by reacting sodium sulfohydride with w-chloroalkyl containing organopolysiloxanes in the presence of dimethylformamide. Also, U.S. Pat. No. 2,960,492 to Morton et al disclose a process for preparing sulfur containing organopolysiloxanes by reacting a vinyl containing siloxane with a mercaptan to form an adduct therewith by combining the sulfohydride group with the unsaturated vinyl group of the siloxane. U.S. Pat. No. 3,388,144 to Musolf et al discloses reacting a siloxane containing one or two mercaptoalkyl groups per silicon atom with a polyhydroxylated carbon compound containing an unsaturated olefin group in the presence of a peroxide catalyst.

The above described processes for preparing thiofunctional siloxane polymers have several disadvantages. For example, long reaction times are required. Also, siloxanes having chloroalkyl groups or vinyl unsaturation are required as one of the reactants. Moreover, it is very difficult to obtain complete conversion of the chloroalkyl groups or vinyl groups to thiofunctional groups, thus polymers having both functional groups are obtained from the above processes.

U.S. Pat. No. 4,046,795 to Martin discloses a process for preparing thiofunctional polysiloxane polymers by reacting a disiloxane and/or a hydroxy or hydrocarbonoxy containing silane or siloxane with a cyclic trisiloxane in the presence of an acid catalyst, in which at least one of the silanes or siloxanes contain a thiol group. However, when a cyclic siloxane containing more than three silicon atoms, e.g., octamethylcyclotetrasiloxane, is substituted for hexamethylcyclotrisiloxane, there is no detectable reaction observed in the presence of an acid catalyst. Surprisingly, it has been found that the thiofunctional polysiloxane polymers prepared in accordance with U.S. Pat. No. 4,046,795 will further react with siloxanes having more than three silicon atoms in the molecule in the presence of an acid catalyst to form higher molecular weight thiofunctional polysiloxane polymers. This process is of commercial significance since it now provides a means for utilizing organopolysiloxanes such as cyclic siloxanes having more than three silicon atoms per molecule in the preparation of thiofunctional polysiloxane polymers.

Therefore, it is an object of this invention to provide a method for preparing thiofunctional polysiloxane polymers which do not require vinyl unsaturation or chloroalkyl substituents. A further object of this invention is to provide a method for preparing a broad spectrum of thiofunctional polysiloxanes from siloxanes having more than three silicon atoms per molecule in the presence of an acid catalyst.

SUMMARY OF THE INVENTION

The foregoing objects and others which will become apparent from the following description are accomplished in accordance with this invention, generally speaking, by providing a method for preparing thiofunctional polysiloxane polymers by equilibrating a mixture containing (1) an organopolysiloxane having at least four silicon atoms per molecule and (2) a thiofunctional polysiloxane copolymer having at least one unit of the formula

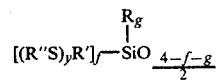

and the other units are selected from the formulas $R_2SiO$, $R_3SiO_{0.5}$ and $RO_{0.5}$, in which R is a monovalent hydrocarbon radical having up to 18 carbon atoms, R' is a substituted or unsubstituted divalent, trivalent or tetravalent hydrocarbon radical having up to 18 carbon atoms, hydrocarbon ether, hydrocarbon thioether, hydrocarbon ester and hydrocarbon thioester radicals, R'' is a monovlent hydrocarbon radical or hydrogen, f is a number of from 1 to 3, g is a number of from 0 to 1 and the sum of f+g is from 1 to 3 and y is a number of from 1 to 3, and (3) up to 35 percent by weight of an organopolysiloxane having up to three silicon atoms per molecule based on the weight of (1) and (3), at a temperature of from about 25° C. up to about 200° C. in the presence of an acid catalyst.

DETAILED DESCRIPTION OF INVENTION

Organopolysiloxanes (1) which may be reacted with the thiofunctional polysiloxane copolymers are cyclic or linear organopolysiloxanes having the general formula

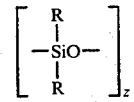

where R is a monovalent hydrocarbon radical or a halogenated monovalent hydrocarbon radical having up to 18 carbon atoms and z is a number of at least 4 and up to 20,000.

Examples of suitable monovalent hydrocarbon radicals represented by R are alkyl radicals such as methyl, ethyl, propyl, butyl, pentyl, hexyl, octyl, decyl and octadecyl radicals; aryl radicals such as phenyl, diphenyl and naphthyl radicals; alkaryl radicals such as tolyl, xylyl and ethylphenyl radicals; aralkyl radicals such as benzyl, α-phenylethyl, β-phenylethyl, α-phenylbutyl radicals; cycloalkyl radicals such as cyclobutyl, cyclopentyl, cyclohexyl radicals and halogenated hydrocarbon radicals such as chloromethyl, bromoethyl, tetrafluoroethyl, fluoroethyl, trifluorotolyl, and hexafluoroxylyl radicals.

Examples of preferred cyclic organopolysiloxanes (1) are octamethylcyclotetrasiloxane, octaethylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, octadecamethylcyclononasiloxane and eicosamethylcyclodecasiloxane.

Examples of other organopolysiloxanes which may be used are those represented by the unit formula

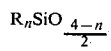

wherein each R is the same as above and n has an average value of from 1.95 to 2.01. These organopolysiloxanes have terminal triorganosiloxy units and consist essentially of the same or different chemically combined siloxy units having an average of about two organic radicals attached to the silicon atom. Diorganosiloxane units predominate in such polymers and constitute more than 50 molar percent or more of the units present. However, limited amounts of monorganosiloxane units and triorganosiloxane units can be present so long as the average organic substituent to silicon ratio remains within the prescribed limits. All of the organic substituents in the polymer can be the same or different. It is preferred that at least 50 percent of the substituents be methyl radicals. Mixtures of polymers as well as copolymers can be employed. The operative polymers have a viscosity in the range of from 5 cs. to 500,000 cs. at 25° C. and more preferably from about 50 to 300,000 cs. at 25° C.

Suitable examples of linear or branched organopolysiloxanes(1) which may be employed in this invention are decamethyltetrasiloxane, tetradecamethylhexasiloxane, octadecamethyloctasiloxane, eicosamethylnonisiloxane and organopolysiloxanes consisting essentially of dimethylsiloxy units, or a mixture of chemically combined dimethylsiloxy units and phenylsiloxy units, such as methylphenylsiloxy units and diphenylsiloxy units.

In the equilibration, the mixture may also contain (3) siloxanes having less than four silicon atoms in the molecule in combination with the organopolysiloxanes (1) having at least four silicon atoms in the molecule. Thus, where a mixture of siloxanes are employed, the siloxanes having less than four silicon atoms in the molecule may be present in an amount of from 0 to 35 percent by weight based on the weight of the siloxanes having less than four silicon atoms per molecule and those having at least four silicon atoms per molecule. In any event, the organopolysiloxanes (1) having at least four silicon atoms in the molecule should be present in an amount of at least 65 percent by weight based on the weight of the siloxanes (3) having less than four silicon atoms per molecule and those siloxanes (1) having at least four silicon atoms per molecule.

Examples of siloxanes (3) having less than four silicon atoms per molecule are disiloxanes such as hexamethyldisiloxane, hexapropyldisiloxane, hexabutyldisiloxane and trisiloxanes such as octamethyltrisiloxane, octabutyltrisiloxane, hexamethylcyclotrisiloxane, hexabutylcyclotrisiloxane and 1,2,3-trimethyl-1,2,3-triphenylcyclotrisiloxane.

The thiofunctional polysiloxane copolymers (2) which are equilibrated with the organopolysiloxanes (1) having at least four silicon atoms per molecule are prepared in accordance with the procedure described in U.S. Pat. No. 4,046,795 to Martin in which a cyclictrisiloxane is reacted with a disiloxane and/or a hydroxy or hydrocarbonoxy containing silane or siloxane in the presence of an acid catalyst in which at least one of the bove organosilicon compounds contain a thiol group.

Cyclic trisiloxanes employed in the preparation of thiofunctional polysiloxane copolymers (2) are those represented by the general formula

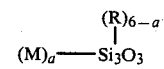

where R is the same as above, M is a group represented by the formula R'(SR''''$)_y$ and

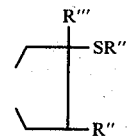

where R' is a substituted or unsubstituted divalent, trivalent or tetravalent hydrocarbon radical free of aliphatic unsaturation having from 1 to 18 carbon atoms, hydrocarbon ether, hydrocarbon thioether, hydrocarbon ester, and hydrocarbon thioester radicals in which R' is attached to the silicon atom via a silicon-carbon bond, R'' is hydrogen or a monovalent hydrocarbon radical having from 1 to 18 carbon atoms, R''' which may be the same as R'' or a radical represented by the formula R''''X, where X is $$\overset{O}{\underset{\|}{HC}}-,$$

—OOCR, OH or a cyanoalkyl radical, R'''' is a divalent hydrocarbon radical free of aliphatic unsaturation having from 1 to 18 carbon atoms, a is a number of from 0 to 6 and y is a number of from 1 to 3.

Disiloxanes which may be employed in the preparation of the thiofunctional polysiloxane copolymers (2) may be represented by the formula

where R, M and a are the same as above.

Suitable examples of silanes or siloxanes which may be reacted with the cyclic trisiloxanes or mixtures of the cyclic trisiloxanes and disiloxanes to form the thiofunctional polysiloxane copolymers (2) are silanes of the general formula

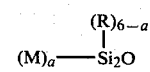

or siloxanes of the general formula

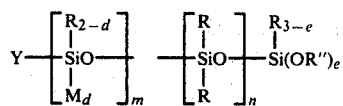

where R, R" and M are the same as above, Y is a radical of the formula $R_3SiO_{0.5}$ and

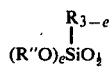

where R and R" are the same as above, b is a number of from 0 to 3, c is a number of from 0 to 3 and the sum of b+c is from 1 to 2, d is a number of from 0 to 2, e is a number of from 1 to 3, m and n are each equal to a number of from 0 to 999 and the sum of m+n is at least 1.

Examples of suitable divalent hydrocarbon radicals represented by R' and R"" are ethylene, trimethylene, tetramethylene, hexamethylene, octamethylene and the like. Suitable examples of trivalent and tetravalent hydrocarbon radicals are represented by the formula —CHCH$_2$—, =CHCH$_2$CH$_2$—, =CH(CH$_2$)$_3$—, =CH(CH$_2$)$_4$—, =CH(CH$_2$)$_{17}$—,

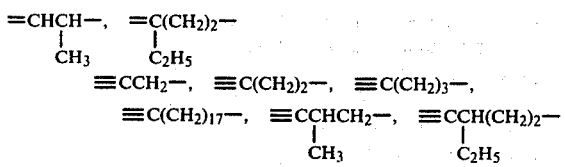

and the like.

Suitable examples of monovalent hydrocarbon radicals represented by R" are alkyl radicals such as methyl, ethyl, propyl, butyl, pentyl, hexyl, octyl, decyl, octadecyl; aryl radicals such as phenyl, diphenyl and naphthyl; alkaryl radicals such as tolyl, xylyl and ethylphenyl; aralkyl radicals such as benzyl, α-phenylethyl, B-phenylethyl, α-phenylbutyl and cycloalkyl radicals such as cyclobutyl, cyclopentyl and cyclohexyl.

Suitable examples of R'(SR''')$_y$ groups include
—CH$_2$SH, —C$_2$H$_4$SH, —C$_3$H$_6$SH, —CH$_2$SC$_4$H$_9$,
—C$_2$H$_4$SC$_2$H$_5$, —C$_3$H$_6$SC$_6$H$_5$,
(HSCH$_2$)$_2$CHCH$_2$CH$_2$—,
(HSCH$_2$CH$_2$)(HSCH$_2$)CH(CH$_2$)$_4$—,
(HSCH$_2$CH$_2$)$_3$CCH$_2$CH$_2$—,
(HSCH$_2$CH$_2$)(HSCH$_2$)CHCH(CH$_2$SH)CH$_2$CH$_2$CH$_2$—,
HS(CH$_2$)$_5$CH(CH$_2$CH$_2$SH)CH$_2$CH$_2$CH(CH$_2$CH$_3$)—,
(HSCH$_2$CH$_2$)$_2$CHCH$_2$CH$_2$—,
(HSCH$_2$)$_2$CHSCH$_2$CH$_2$CH$_2$—,
(HSCH$_2$)$_2$(C$_2$H$_5$)CCH$_2$SCH$_2$CH$_2$CH$_3$—,
(HSCH$_2$)$_3$CCH$_2$SCH$_2$CH$_2$CH$_2$—,
(HSCH$_2$)(HSCH$_2$CH$_2$CH$_2$CH$_2$)CHSCH$_2$CH$_2$CH$_2$—,
(HSCH$_2$CH$_2$)$_2$CHCH$_2$SCH$_2$CH$_2$CH$_2$—,
(HSCH$_2$)$_2$(C$_2$H$_5$)CCH$_2$SCH$_2$CH$_2$S(CH$_2$)$_3$—,
(HSCH$_2$)$_3$CCH$_2$S(CH$_2$)$_3$S(CH$_2$)$_3$—,

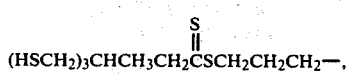

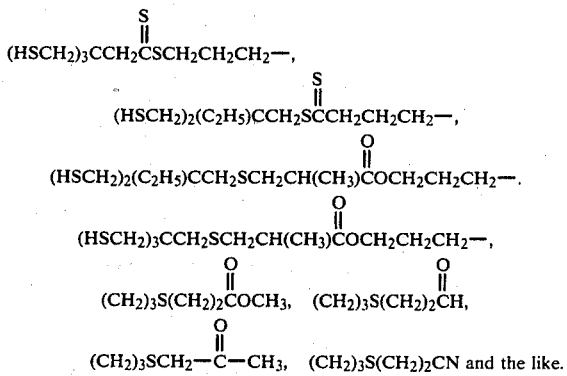

Hydroxy and hydrocarbonoxy containing silanes which may be used to prepare the thiofunctional polysiloxane copolymer (2) employed in this invention are silanes such as 3-mercaptopropyltrimethoxysilane, 2-mercaptoethyltriethoxysilane, w-mercaptodecyltriethoxysilane, w-mercaptoamyltriethoxysilane, 2-(triethoxysilyl)ethyl butyl thioether, 3-(trimethoxysilyl)propyl butyl thioether, 4-(triethoxysilyl)butyl methyl thioether, 2-(methyldiethoxysilyl)ethyl methyl thioether, 2-(methyldiethoxysilyl)ethyl phenyl thioether, 2-(methyldiethoxysilyl)ethyl dodecyl thioether, 6-(trimethoxysilyl)hexyl ethyl thioether, methyltriethoxysilane, dimethyldiethoxysilane, trimethylethoxysilane, dimethylsilane diol, diphenylsilane diol and the like.

Also, the corresponding siloxanes or copolymers thereof which contain at least one or more alkoxy or hydroxy groups may be employed in the preparation of the thiofunctional polymers. Suitable examples of these polysiloxanes are monoethoxy endblocked beta-mercaptoethylpropylpolysiloxane or methyldiethoxy silyl endblocked beta-mercaptobutylmethylpolysiloxane, monohydroxy endblocked beta-mercaptoethyl methyl polysiloxane, dihydroxy endblocked dimethylpolysiloxane and diethoxy-endblocked dimethylpolysiloxane.

These polysiloxanes may be prepared either by the cohydrolysis and condensation of trialkylalkoxysilanes with thiol containing organopolysiloxanes or by the equilibration of cyclic thiol containing organopolysiloxanes with silicon atoms containing predominantly silicon-bonded alkoxy groups.

Other hydroxy and/or hydrocarbonoxy silicon compounds which may be employed as one of the initial reactants with the cyclic trisiloxane or mixture of cyclic trisiloxane and disiloxane are the silacyclopentane thiol compounds disclosed in U.S. Pat. No. 3,655,713 to Le Grow.

Examples of suitable cyclic trisiloxanes which may be used in the preparation of the thiofunctional polymers (2) used in the process of the present invention are hexamethylcyclotrisiloxane, hexaethyltrisiloxane, hexaphenyltrisiloxane, hexabutyltrisiloxane, hexaoctyltrisiloxane, 1,2,3-trimethyl-1,2,3-triphenylcyclotrisiloxane and the like.

The thiofunctional polysiloxane polymers of this invention are prepared by equilibrating (1) an organopolysiloxane having at least four silicon atoms per molecule or a mixture of organopolysiloxanes in which at least 65 percent by weight of the mixture consists of organopolysiloxanes having at least four silicon atoms per molecule and (2) a thiofunctional polysiloxane copolymer in the presence of acid catalysts.

Catalysts which may be employed in affecting the equilibration are acid clays and organic and inorganic acids having a pK value less than 1.0 and more preferably below 0.7 in aqueous solutions. Suitable acid catalysts which may be employed are benzosulfonic acid, para-toluenesulfonic acid, sulfuric acid, sulfurous acid, nitric acid, perchloric acid, hydrochloric acid and acid clays such as Filtrol No. 13 and No. 24 (available from Filtrol Corporation).

Although the amount of catalyst is not critical, it is preferred that from about 0.003 percent up to about 10 percent by weight of catalyst based on the total weight of the reactants, i.e., the organopolysiloxane (1), the thiofunctional polysiloxane copolymer (2) and organopolysiloxane (3) be employed. Greater amounts of catalyst may be used; however, it is the intent of this invention to provide a catalyst system which does not alter the functionality of the resultant composition.

Generally, it is desirable to remove or destroy the catalysts after the equilibration is complete because their presence will adversely affect the properties of the resulting polymer. The catalysts may be removed, for example, by washing with water or they may be destroyed by neutralizing with basic reagents. In addition, certain catalysts, for example acid clays, may be removed by filtering the reaction mixture.

The equilibration may be conducted at any temperature ranging from about 25° C. up to about 200° C. over a period of time ranging from 0.5 hour up to several days and, if desired, in the presence of a hydrocarbon solvent. Under certain conditions, for example, when an anhydrous acid catalyst is employed, a catalytic amount of a protic compound is required to effect the equilibration. The term protic compound refers to compounds having a reactive hydrogen such as alcohols, e.g., methanol, ethanol, propanol, butanol and water. The amount of protic compound is not critical and may range from about 0.0001 to about 10 percent based on the total weight of the silane and siloxane reactants.

The equilibration may be conducted in the absence of a solvent; however, when a solvent is employed, it may be employed in an amount of from about 1 to 50 percent by weight based on the weight of the reactants. Examples of suitable hydrocarbon solvents are heptane, benzene, toluene, xylene and the like. Moreover, it is preferred that the reaction be conducted in an inert atmosphere.

The thiofunctional polysiloxane polymers of this invention may be used as metal protectants and as release agents on metal substrates. These compositions may be applied to metal surfaces to improve their resistance to corrosion and to high temperature oxidation. Also, these compositions are useful in duplicating machines, as coating agents and as release agents.

The thiofunctional polysiloxane copolymers (2) employed in the equilibration reaction with the organopolysiloxanes (1) having at least four carbon atoms are prepared in the following manner in which all parts are by weight.

(A) To a one liter reaction vessel is added 243 parts of hexamethyldisiloxane, 196 parts of 3-mercaptopropyltrimethoxysilane, 196 parts of water, 100 parts of heptane and 5 parts of Filtrol No. 13 acid clay (available from Filtrol Corporation). The vessel is heated to 80° C. and maintained at this temperature for three hours. The contents of the vessel are then cooled to room temperature and filtered. The volatiles are removed by heating for 2 hours at 150° C. at less than 1 torr. A clear, transparent liquid is obtained having a viscosity of 871 cs. at 25° C. Nuclear Magnetic Resonance (NMR) analysis shows that the product has a mol ratio of $CH_2S:HSC_3H_6:Si\ CH_3$ of 1.0:1.0:2.43. The SH content of the product is about 14.4 percent.

(B) To a reaction vessel are added 79.7 parts of hexamethylcyclotrisiloxane and 6.2 parts of heptane. The vessel is heated to 70° C., then 4.9 parts of 3-mercaptopropyltrimethoxysilane, 4.9 parts of water, 2.9 parts of hexamethyldisiloxane and 1.5 parts of acid clay (Filtrol No. 13) are added to the vessel. The reactants are heated to 80° C. and maintained at this temperature for three hours. The contents of the vessel are cooled to room temperature and filtered. The volatiles are than removed at 185° C. at less than 1 torr.

A clear transparent liquid is obtained having a viscosity of 97.3 cs. at 25° C. and an SH content of 0.975 percent. Nuclear Magnetic Resonance (NMR) analysis shows that the product has a mol ratio of $CH_2S:Si(CH_3)_2$ of 1:52.6.

The embodiments of this invention are further illustrated by the following examples in which all parts are by weight unless otherwise specified.

EXAMPLE 1

To a reaction vessel containing 84.4 parts of the thiofunctional polysiloxane copolymer prepared in accordance with (A) above, are added 1184 parts of octamethylcyclotetrasiloxane, 21.5 parts of hexamethyldisiloxane and 25.8 parts of acid clay (Filtrol No. 13) and heated to 80° C. for three hours. The contents of the reaction vessel are cooled to 45° C. and vacuum filtered. The filtrate is heated to 185° C. at 1 torr to remove the volatiles. A clear transparent liquid is obtained having a viscosity of 71.2 cs. at 25° C. and an SH content of 1.26 percent. Nuclear Magnetic Resonance (NMR) analysis shows that the product has a mol ratio of $CH_2S:CH_2:Si(CH_3)_2$ of 1:0.73:2.2.

EXAMPLE 2

To a reaction vessel containing 200 parts of the thiofunctional polysiloxane copolymer prepared in accordance with (B) above, are added 200 parts of a trimethylsiloxy-terminated dimethylpolysiloxane having a viscosity of 1000 cs. at 25° C. and 8 parts of acid clay (Filtrol No. 13) and heated to 155° C. for six hours. The contents of the vessel are cooled to room temperature and vacuum filtered. A liquid having a slight haze is obtained having a viscosity of 293 cs. at 25° C. and an SH content of 0.44 percent.

EXAMPLE 3

To a reaction vessel containing 200 parts of the thiofunctional polysiloxane copolymer prepared in accordance with (B) above, are added 200 parts of a trimethylsiloxy-terminated dimethylpolysiloxane having a viscosity of 60,000 cs. at 25° C., 50 parts of hexamethyldisiloxane and 8 parts of acid clay (Filtrol No. 13) and heated to 155° C. for six hours. The contents of the vessel are cooled to room temperature and vacuum filtered. A clear, colorless liquid product is obtained having a viscosity of 400 cs. at 25° C. and an SH content of 0.39 percent. Nuclear Magnetic Resonance analysis of the product shows a ratio of $CH_2S:Si(CH_3)_2$ of 1:98.

COMPARISON EXAMPLE V

A blend is prepared by mixing 100 parts of the thiofunctional polysiloxane copolymer prepared in (B) above with 100 parts of a trimethylsiloxy-terminated dimethylpolysiloxane fluid having a viscosity of 60,000 cs. at 25° C. and 25 parts of hexamethyldisiloxane. The resultant product has a viscosity of 2,354 cs. at 25° C.

EXAMPLE 4

The procedure of Example 3, is repeated except the hexamethyldisiloxane is omitted. The resultant product has a viscosity of 5,681 cs. at 25° C. and an SH content of 0.21 percent. Nuclear Magnetic Resonance analysis of the product shows a ratio of $CH_2S:Si(CH_3)_2$ of 1:83.3.

COMPARISON EXAMPLE $V_1$

A blend is prepared in accordance with the procedure described in Comparison Example V, except that the hexamethyldisiloxane is omitted. The result product has a viscosity of 6,488 cs. at 25° C.

EXAMPLE 5

The procedure of Example 3 is repeated except that a trimethylsiloxy-terminated dimethylpolysiloxane having a viscosity of 20 cs. at 25° C. is substituted for the trimethylsiloxy-terminated diorganopolysiloxane having a viscosity of 60,000 cs. at 25° C. A clear, colorless product is obtained having a viscosity of 33.4 cs. at 25° C. and an SH content of 0.436 percent. Nuclear Magnetic Resonance analysis of the product shows a ratio of $CH_2S:Si(CH_3)_2$ of 1:104.2.

COMPARISON EXAMPLE $V_2$

A blend is prepared in accordance with Comparison Example $V_1$, except that a trimethylsiloxy-terminated dimethylpolysiloxane having a viscosity of 20 cs. at 25° C. is substituted for the trimethylsiloxy-terminated diorganopolysiloxane having a viscosity of 60,000 cs. at 25° C. The result product has a viscosity of 46 cs. at 25° C.

EXAMPLE 6

To a reaction vessel containing 45 parts of the thiofunctional polysiloxane copolymer prepared in accordance with (A) above, are added 250 parts of octamethylcyclotetrasiloxane and 6 parts of acid clay (Filtrol No. 13) and heated to 145° C. for six hours. The product is cooled, filtered and the volatiles removed at a temperature of 185° C. at less than 1 torr. The resultant product is a colorless, hazy fluid having a viscosity of 90 cs. at 25° C. and an SH content of 0.94 percent.

COMPARISON EXAMPLE $V_3$

To a reaction vessel containing 415.5 parts of octamethylcyclotetrasiloxane are added 37.5 parts of toluene, 28.5 parts of 2-mercaptopropyltrimethoxysilane, 21 parts of water, 15 parts of hexamethyldisiloxane and 9 parts of acid clay (Filtrol No. 13) and heated to reflux temperature. The water and methanol are azetroped off and collected in a dean stark head. The contents are refluxed three days and after each day a sample is withdrawn, filtered and the volatiles removed. After three days, the contents of the reaction vessel are still volatile and the viscosity remains fairly constant indicating that no equilibration has occurred.

Comparison Example $V_3$ shows that a cyclic siloxane having at least four silicon atoms in the molecule will not equilibrate with a thiofunctional silane; however, Example (6) shows that the same cyclic siloxane will equilibrate with a thiofunctional polysiloxane copolymer.

What is claimed is:

1. A process for preparing thiofunctional polysiloxane polymers which comprises (1) reacting a cyclic trisiloxane with a hydroxy or hydrocarbonoxy containing organosilicon compound selected from the group consisting of silanes and siloxanes in the presence of a catalyst hhaving a pK value below 1, in which one of the silicon reactants contains at least one thiol group, to form a thiofunctional copolymer having at least one unit of the formula

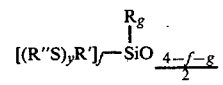

and the other units are selected from the formulas $R_2SiO$, $R_3SiO_{0.5}$ and $RO_{0.5}$ and thereafter (2) equilibrating the thiofunctional polysiloxane copolymer with an organopolysiloxane containing at least four silicon atoms per molecule in the presence of an acid catalyst having a pK value of less than 1 in an aqueous solution, in which R is a monovalent hydrocarbon radical having from 1 to 18 carbon atoms, R' is a substituted or unsubstituted divalent, trivalent or tetravalent radical free of aliphatic unsaturation having from 1 to 18 carbon atoms, hydrocarbon ether, hydrocarbon thioether, hydrocarbon ester and hydrocarbon thioester radicals, R" is a monovalent hydrocarbon radical or hydrogen, f is a number of from 1 to 3, and g is a number of from 0 to 1 and the sum of f+g is from 1 to 3 and y is a number of from 1 to 3.

2. The process of claim 1, wherein the mixture also contains (3) from 0 to 35 percent by weight of an organopolysiloxane having less than four silicon atoms in the molecule based on the weight of siloxanes (1) and (3).

3. The process of claim 1, wherein the acid catalyst is present in an amount of from 0.003 percent up to about 10 percent by weight based on the weight of the organopolysiloxane and thiofunctional polysiloxane copolymers.

4. The process of claim 1, wherein the equilibration is conducted in the presence of a catalytic amount of an acid clay.

5. The process of claim 1, wherein the equilibration is conducted at a temperature of from 25° C. up to about 200° C.

6. The process of claim 1, wherein the equilibration is conducted in the presence of a protic compound.

7. The process of claim 1, wherein the equilibration is conducted in the presence of a hydrocarbon solvent.

8. The process of claim 1, wherein the organopolysiloxane is a cyclic siloxane having at least four carbon atoms.

9. The process of claim 1, wherein the organopolysiloxane is a linear organopolysiloxane.

10. The product obtained from the process of claim 1.

* * * * *

UNITED STATES PATENT AND TRADEMARK OFFICE
CERTIFICATE OF CORRECTION

PATENT NO. : 4,230,816

DATED : October 28, 1980

INVENTOR(S) : Eugene R. Martin

It is certified that error appears in the above—identified patent and that said Letters Patent are hereby corrected as shown below:

Column 10, Line 64, after "four" delete carbon and insert ---silicon---, which corrects the line to read "four silicon atoms".

Signed and Sealed this

Eighth Day of February 1983

[SEAL]

Attest:

GERALD J. MOSSINGHOFF

Attesting Officer

Commissioner of Patents and Trademarks